United States Patent [19]

Wesner

[11] 4,095,917

[45] Jun. 20, 1978

[54] DIE HOLDER

[76] Inventor: Arden L. Wesner, 1235 Venus, St. Joseph, Mich. 49085

[21] Appl. No.: 728,750

[22] Filed: Oct. 1, 1976

[51] Int. Cl.² .................................................. B23G 1/46
[52] U.S. Cl. ............................... 408/239 R; 10/123 S; 81/177 G; 408/221
[58] Field of Search .................. 408/125, 221, 241 R, 408/238, 239; 81/121 R, 125, 177 D, 177 G, 177 ST; 279/83; 10/123 R, 123 S

[56] References Cited

U.S. PATENT DOCUMENTS

| 3,715,168 | 2/1973 | Kuhn | 81/177 G X |
| 3,738,768 | 6/1973 | Kuhn | 81/177 ST X |

FOREIGN PATENT DOCUMENTS

| 186,743 | 10/1922 | United Kingdom | 10/123 S |

*Primary Examiner*—Z. R. Bilinsky
*Attorney, Agent, or Firm*—Blanchard, Flynn, Thiel, Boutell & Tanis

[57] ABSTRACT

Holder for a threading die. A die holder is provided for threading elongated items of circular cross section, particularly pipe or rod, which can utilize dies of either hexagonal or circular external contour, which can be arranged to reach otherwise awkward places, which can be rotated either by a wrench or by handles and which under certain conditions of use permits a long article such as rod material to pass entirely therethrough. A generally tubular body part has a recess, preferably hexagonal, in one end thereof for the reception of either a hexagonal or a circular die. If a circular die is used, same can be held in position by a set screw. The other end of said body member is externally contoured for receiving a wrench and has an end opening of normally rectangular cross section which is on a common center with the axis of said die. Thus, said die holder can be rotated by a wrench either directly on said last-named end thereof or through an extension inserted into said rectangular opening. There is also provided cross arms which may be threaded or pressed into position radially of said die holder for effecting rotation thereof if preferred. If the die holder is rotated either by a wrench or by said cross arms, same may be used to thread a rod and the rod may then project through said rectangular opening.

1 Claim, 5 Drawing Figures

DIE HOLDER

FIELD OF THE INVENTION

The invention relates to a holder for a threading die and particularly to a type thereof which is manually rotated through any of several alternate means and under some circumstances is capable of permitting an elongated workpiece to pass entirely therethrough.

BACKGROUND OF THE INVENTION

While a wide number of devices have been offered to the market for effecting the manual rotation of threading dies in connection with any of pipe or rod or similar workpieces, there are many instances where the workpiece to be threaded is located in a place which is difficult of access and hence not convenient for use with presently conventional die holding means. While a wide variety of die holders have been provided for rotation by various manual means, as well as for effecting threading in a variety of locations and under a variety of circumstances, there still exists a need for a die holder which combines in a single instrument a choice of several manual driving means as well as a versatility in capacity to reach a variety of otherwise difficult to reach work locations.

Accordingly, the objects of the invention include:

1. To provide a die holder which can be driven by a selected one of a plurality of manually operable means whereby to enable threading operations to be performed in locations which would otherwise be difficult of access.

2. To provide a device, as aforesaid, which can receive and utilize either a hexagonal or a circular die.

3. To provide a device, as aforesaid, which can be rotated manually by radially positioned handles or alternatively by a wrench, or further can be rotated by a wrench or similar device acting through an extension of the type often used with socket wrenches.

4. To provide a device, as aforesaid, which will be simple yet reliable and sturdy.

5. To provide a device, as aforesaid, whose operation will be obvious and further one which will be simple and economic to manufacture.

Other objects and purposes of the invention will be apparent to persons acquainted with devices of this general type upon reading the following specification and inspection of the accompanying drawings.

DETAILED DESCRIPTION

Figure 4:
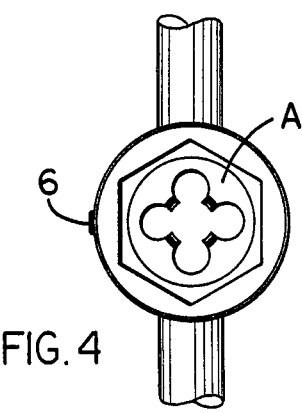
FIG. 4 is a view similar to FIG. 2 but with an hexagonal threading die in position.
Figure 5:
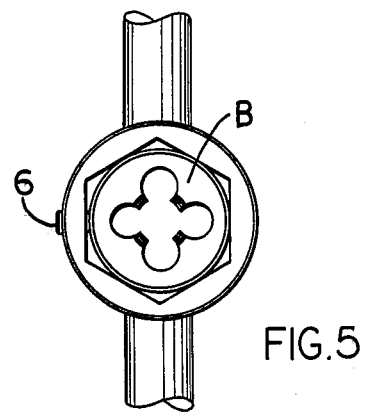
FIG. 5 is a view similar to FIG. 2 but with a circular threading die in operating position.

In carrying out the objects and purposes above set forth, I have provided a die receiver having a generally cylindrical body part 1 provided with a central opening 2 having an enlarged die receiving opening 3 at one end thereof. In this embodiment, and preferably, said die receiving opening is hexagonal in cross-sectional shape whereby to receive in driving relationship therewith either a hexagonal threading die A as shown in FIG. 4 or a circular threading die B as shown in FIG. 5. In the case of the hexagonal threading die, it is desirable but not always essential to hold same in place by auxiliary means such as the set screw 6 but it will be self-evident that in the case of the round threading die B such holding as by the set screw 6 will be essential.

Figure 1:
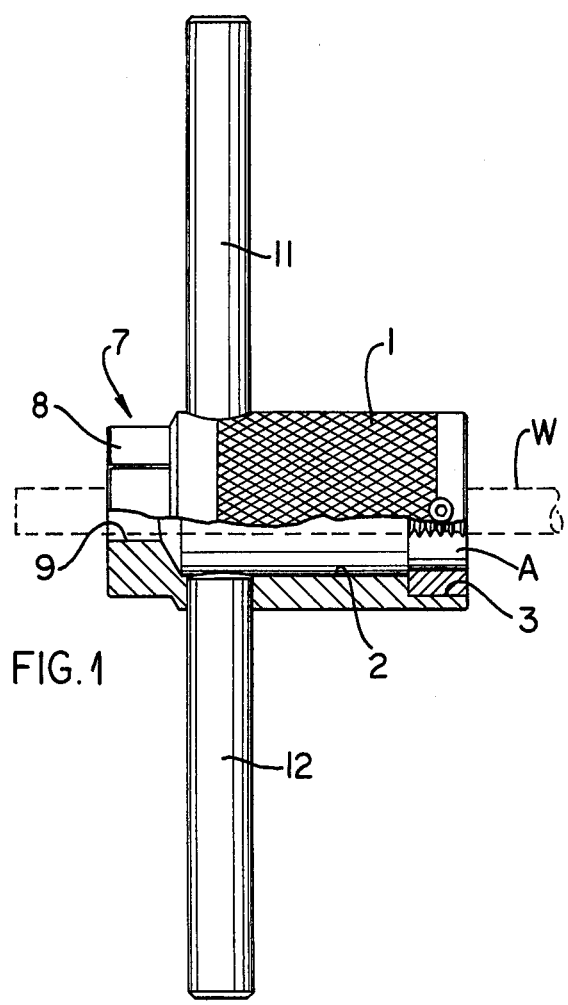
FIG. 1 is a side elevational view of a device embodying the invention, same being shown partially in central section.
Figure 2:
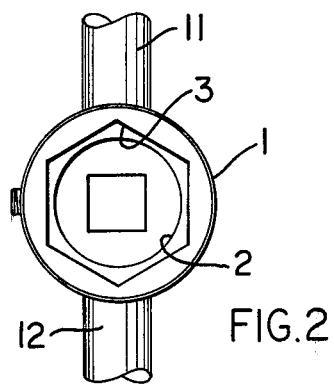
FIG. 2 is a fragmentary view of the tool of FIG. 1 taken from the right-hand end thereof as appearing in FIG. 1 with the threading die removed therefrom.
Figure 3:
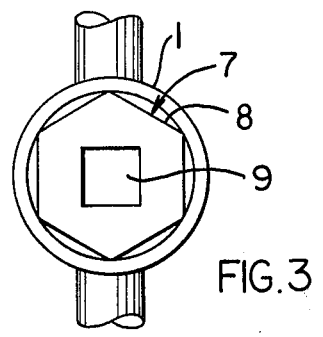
FIG. 3 is a left-hand fragmentary view of the device referring to the showing thereof appearing in FIG. 1.

At the leftward end of the body part 1 there is provided a wrench portion 7 which in this embodiment is of somewhat reduced diametrical dimension in order to facilitate the positioning of a wrench thereon. Said portion 7 is preferably of hexagonal cross section as shown in FIG. 3 to provide flats of which one appears at 8 for the reception of a wrench thereon. Said wrench section 7 is also penetrated by an opening 9 which will normally, as here, be of rectangular section. This opening functions both for the reception of an extension member thereinto or for the extension therethrough of a rod W being threaded.

Handles 11 and 12 are also affixed into said body member, either by pressing same thereinto as here or by threaded attachments if preferred.

In operation, an hexagonal threading die A of any conventional type may for example be inserted into the opening 3 as shown in FIG. 4 and if desired the set screw 6 may be tightened. A rod or pipe W may be introduced in the usual manner into the threading jaws of the threading die for operation thereon by said die. The tool may then be rotated by manually grasping the handles 11 and 12 and effecting both rotation and whatever axial thrust of the die onto the workpiece W is needed. Alternatively, however, if desired, such as where more leverage is needed for threading a workpiece of relatively hard material, a suitable wrench may be applied to the wrench section 7 and the tool rotated by such wrench. In such case, if the handles 11 and 12 are threaded or otherwise affixed so as to be capable of easy removal, it is sometimes preferable to remove them under these conditions so as to avoid interference with possible adjacent interfering features. This would be particularly true if the pipe or rod being threaded is already in position on the machine, in a building, or otherwise located in a restricted location.

As a still further alternate, an extension having a rectangular section at one end of shape and size to fit snugly into the opening 9 and of such shape at its other end as to receive a wrench, such as the conventional extension commonly utilized in connection with socket wrenches, may be inserted into the rectangular opening 9 and driven by a wrench to effect the desired rotation of the die holder body 1.

Whether the die holder 1 is being rotated by a wrench acting on the wrench section 7 or is being rotated by the handles 11 and 12, the workpiece, particularly where a rod W is being threaded, may be permitted to extend through the opening 9 where desired for effecting an elongated threading thereof.

Although a particular preferred embodiment of the invention has been disclosed above for illustrative purposes, it will be understood that variations or modifications of the disclosed apparatus, including the rearrangement of parts, lie within the scope of the present invention.

The embodiments of the invention in which an exclusive property or privilege is claimed are defined as follows:

1. In a device for receiving and rotating a threading die, the combination comprising:

an elongated rigid body part having an elongated opening extending centrally therethrough, said elongated opening including an elongated central opening portion terminating at the opposite ends thereof in first and second end opening portions disposed adjacent the opposite ends of said body part;

said first opening portion being disposed adjacent and opening outwardly through one end of said body part, said first opening portion being bounded by a plurality of circumferentially spaced, inwardly facing flat walls which define a hexagonal die-receiving opening shaped for reception of a threading die therein;

said second end opening portion being disposed adjacent and opening outwardly through the other end of said body part, said second opening portion being bounded by a plurality of circumferentially spaced, inwardly facing flat walls which define a substantially rectangular extension-receiving opening shaped for the reception of a rectangular driving extension;

said body part adjacent said other end thereof being provided with at least one pair of opposed external flats for the reception of a wrench, said flats being substantially radially aligned with the walls defining the extension-receiving opening;

said body part also having a pair of handle openings formed radially therein on substantially diametrically opposite sides thereof, said handle openings being disposed intermediate the opposite ends of said body part and projecting radially inwardly from the outer peripheral surface thereof;

a pair of elongated rodlike handles having the inner ends thereof releasably secured within said pair of handle openings, said handles projecting radially outwardly of said body part in substantially diametrically opposite directions;

said die-receiving opening, said wrench section and said extension-receiving opening all being symmetrical about the central longitudinal extending axis of said central opening portion;

whereby a die held within the die-receiving opening of said body part may be rotated simultaneously with said body part as desired by manual application of force to said handles, by manual application of force through a wrench onto the flats of the wrench section, or by manual application of force through an extension to the walls defining said extension-receiving opening.

* * * * *